March 6, 1928.
H. A. SKINNER
1,661,509
MILLING MACHINE ATTACHMENT
Filed April 23, 1926
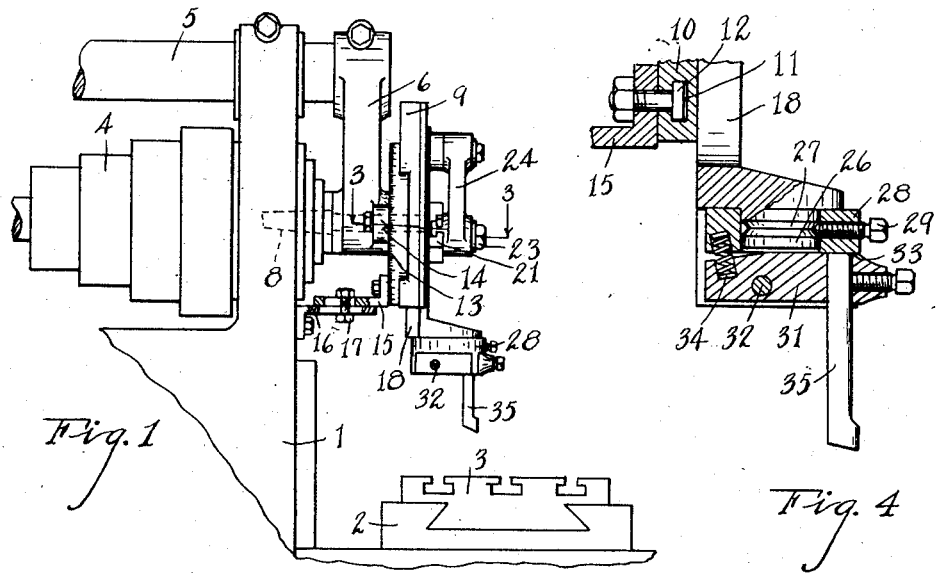
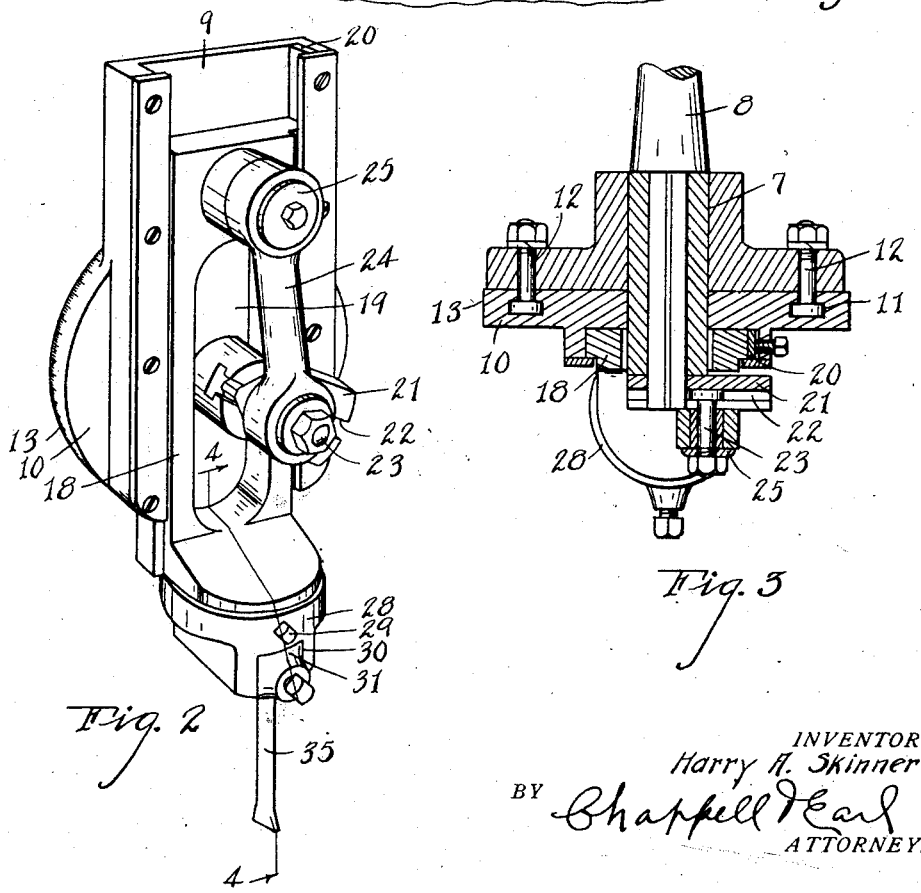
INVENTOR
Harry A. Skinner
BY Chappell & Earl
ATTORNEYS Patented Mar. 6, 1928.

1,661,509

UNITED STATES PATENT OFFICE.

HARRY A. SKINNER, OF WATERLOO, MICHIGAN.

MILLING-MACHINE ATTACHMENT.

Application filed April 23, 1926. Serial No. 104,114.

The main objects of this invention are:

First, to provide an improved milling machine attachment which may be readily applied to milling machines of types in quite general use, adapting the same for use in die work and the like.

Second, to provide an attachment of the class described which is adapted for a considerable variety of work.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a fragmentary side elevation of parts of a milling machine with my improvements applied thereto, only such portions of a milling machine being shown as are deemed necessary to illustrate the application of my improvements.

Fig. 2 is a front perspective view of the main operating parts of my improvements.

Fig. 3 is a fragmentary view partially in section on a line corresponding to line 3—3 of Fig. 1.

Fig. 4 is a fragmentary view partially in section on a line corresponding to line 4—4 of Fig. 2.

Referring to the drawing, 1 represents the frame of a milling machine, 2 is the bed thereof and 3 the work slide or table. The headstock is shown conventionally at 4 as is also the ram 5.

I provide a supporting bracket 6 which is mounted on the ram 5 and has a bearing 7 for the arbor or spindle 8 which is operatively associated with the headstock. On this bracket I mount a slideway 9 which has a plate-like portion 10 with undercut grooves 11 in the rear face thereof to receive the bolts 12 by means of which the slide is secured for rotative adjustment relative to the axis of the spindle. One edge 13 of this plate-like portion 10 is provided with a scale which is operatively associated with the pointer 14 on the bracket.

A brace, comprising a section 15 secured to the slide member and a coacting section 16 secured to the frame, the sections being slotted to receive a bolt 17, provides additional support for the slideway. The slide 18 reciprocates in the slideway, the slide having a longitudinal slot 19 to receive the spindle. An adjustable wear plate 20 is provided for the slide which also permits adjustment to prevent chatter or side motion of the slide.

The spindle has a crank arm 21 with a groove 22 therein to receive the head of the crank pin 23 so that the crank pin may be adjusted to regulate its throw. This crank pin is connected by the pitman 24 to a pin 25 on the slide. At its lower end the slide is provided with a stud 26 having an annular groove 27 thereon. The tool holder support 28 is mounted on this stud for rotative adjustment, being held in its adjusted position by means of the set-screw 29. The support 28 has a slot-like recess 30 in its under side in which the tool holder 31 is secured by means of the pivot 32. The support has a rest 33 at its forward end with which the tool holder normally engages as shown in Fig. 4.

A spring 34 acts to hold the holder against this rest but permits the point of the tool 35 to swing away from the work on the up or return stroke of the tool.

My improved die sinking or cutter attachment is quickly mounted upon or removed from a milling machine and without materially changing or modifying the parts, the spindle 8 being substituted for the arbor commonly provided.

I have illustrated only such parts of a milling machine as are deemed necessary to show an adaptation of my improvements. I have not attempted to show other embodiments and adaptations as I believe this disclosure will enable those skilled in the art to embody or adapt my improvements as may be desired.

Having thus described my invention what I claim as new and desire to secure by Letters Patent is:

1. In a structure of the class described, the combination of a headstock, a spindle coacting therewith and provided with a crank having an adjustable crank pin, a supporting bracket through which said spindle is disposed, a slideway mounted on said bracket for rotative adjustment relative to the axis of the spindle, a slide reciprocating in said slideway and slotted to receive said spindle, said slide having an annularly grooved stud at its lower end, a pitman connecting said crank pin to said slide, a tool holder support mounted on said stud for rotative adjustment and having a set screw engaging said groove for securing said support in its adjusted position, said support having a downwardly facing recess in the bottom thereof with a tool holder rest at the forward end of the recess, a tool holder pivotally mounted in said recess to normally engage said rest, and a spring acting to yieldingly hold said tool holder against said rest but permitting it to swing therefrom on the up-stroke of the tool.

2. In a structure of the class described, the combination of a headstock, a spindle co-acting therewith and provided with a crank having an adjustable crank pin, a supporting bracket through which said spindle is disposed, a slideway mounted on said bracket for rotative adjustment relative to the axis of the spindle, a slide reciprocating in said slideway and slotted to receive said spindle, said slide having an annularly grooved stud at its lower end, a pitman connecting said crank pin to said slide, and a tool support mounted on said stud for rotative adjustment and having a set screw engaging said groove for securing said support in its adjusted position.

In witness whereof I have hereunto set my hand.

HARRY A. SKINNER.